US009008232B2

(12) United States Patent
Sagong et al.

(10) Patent No.: US 9,008,232 B2
(45) Date of Patent: Apr. 14, 2015

(54) METHOD AND APPARATUS FOR SUPPORTING FREQUENCY-QUADRATURE AMPLITUDE MODULATION IN WIRELESS COMMUNICATION SYSTEM

(71) Applicant: Samsung Electronics Co., Ltd, Gyeonggi-do (KR)

(72) Inventors: Min Sagong, Gyeonggi-do (KR); Chi-Woo Lim, Gyeonggi-do (KR); Sung-Nam Hong, Gyeonggi-do (KR); Hyun-Kyu Yu, Gyeonggi-do (KR); Kyung-Whoon Cheun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 14/166,779

(22) Filed: Jan. 28, 2014

(65) Prior Publication Data

US 2014/0211880 A1    Jul. 31, 2014

(30) Foreign Application Priority Data

Jan. 28, 2013    (KR) .......................... 10-2013-0009249

(51) Int. Cl.
| | |
|---|---|
| *H03K 9/02* | (2006.01) |
| *H04L 27/14* | (2006.01) |
| *H04L 25/06* | (2006.01) |
| *H04L 27/32* | (2006.01) |
| *H04L 27/26* | (2006.01) |
| *H04L 27/38* | (2006.01) |

(52) U.S. Cl.
CPC .............. *H04L 27/14* (2013.01); *H04L 25/067* (2013.01); *H04L 27/2647* (2013.01); *H04L 27/32* (2013.01); *H04L 27/38* (2013.01)

(58) Field of Classification Search
USPC ......... 375/268, 269, 271, 272, 300, 302, 303, 375/320, 322, 323, 334
See application file for complete search history.

(56) References Cited

U.S. PATENT DOCUMENTS

| | | |
|---|---|---|
| 2006/0104378 A1 | 5/2006 | Allpress et al. |
| 2007/0030925 A1 | 2/2007 | Shashidar et al. |

(Continued)

FOREIGN PATENT DOCUMENTS

WO    WO 2008/133437 A1    11/2008

OTHER PUBLICATIONS

International Search Report dated May 16, 2014 in connection with International Patent Application No. PCT/KR2014/000784, 3 pages.

(Continued)

*Primary Examiner* — Kevin Kim

(57) ABSTRACT

A method for generating a decoding metric in a wireless communication system includes receiving an FQAM symbol and determining transmission probabilities of FQAM symbol candidates from a received value of the FQAM symbol, wherein the transmission probabilities of the FQAM symbol candidates are determined by multiplying a probability that a QAM symbol included in the FQAM symbol is mapped to each of candidate values in one frequency and a probability that a signal is not transmitted in the other at least one frequency. An apparatus in a wireless communication system for supporting FQAM, the apparatus comprising an RF processing unit configured to receive an FQAM symbol, and a modem configured to determine transmission probabilities of FQAM symbol candidates from a received value of the FQAM symbol.

26 Claims, 7 Drawing Sheets

(56) References Cited

U.S. PATENT DOCUMENTS

2008/0019331 A1   1/2008   Thomas et al.
2012/0250805 A1   10/2012   Shin

OTHER PUBLICATIONS

Written Opinion of International Searching Authority dated May 16, 2014 in connection with International Patent Application No. PCT/KR2014/000784, 4 pages.

METHOD AND APPARATUS FOR SUPPORTING FREQUENCY-QUADRATURE AMPLITUDE MODULATION IN WIRELESS COMMUNICATION SYSTEM

PRIORITY

The present application is related to and claims the benefit under 35 U.S.C. §119(a) of a Korean patent application No. 10-2013-0009249 filed in the Korean Intellectual Property Office on Jan. 28, 2013, the entire disclosure of which is hereby incorporated by reference.

TECHNICAL FIELD

The present disclosure relates to the generation of a decoding metric in a wireless communication system.

BACKGROUND

In general, a signaling process for wireless communication at a transmission side includes a channel coding process, a modulation process, a frequency up-converting process, and a transmission process. In response to this, a signaling process at a reception side includes a frequency down-converting process, a demodulation process, and a channel decoding process. Herein, the demodulation process at the reception side includes a process of calculating a decoding metric per bit or symbol. In general, a Log Likelihood Ratio (LLR) is broadly used as the decoding metric.

In order to generate the LLR, it is needed to premise a specific probability distribution for interference and noise signals. A conventional technology assumes a Gaussian distribution for interference signals to perform decoding at a low complexity. Accordingly, in order to make characteristics of the interference signals to be maximally similar to the Gaussian distribution, modulation schemes of Quadrature Amplitude Modulation (QAM) series are mainly used. However, it is generally known that channel capacity of a non-Gaussian channel is greater than that of a Gaussian channel. Accordingly, if suitable decoding is performed, decoding performance may be obtained in the non-Gaussian channel to be higher than that of the Gaussian channel.

Therefore, it will be needed to develop a modulation scheme for following inference signals to a non-Gaussian distribution. As a result, a Frequency QAM (FQAM) scheme is suggested. The FQAM scheme as a hybrid modulation scheme in which a QAM scheme and a Frequency Shift Keying (FSK) modulation scheme are combined has all advantages in that spectrum efficiency is high in the QAM scheme and interference signals of the FSK modulation scheme are converted into non-Gaussian signals.

Because the FQAM scheme is a modulation technology which is newly suggested, there is no method of calculating an LLR which is a decoding metric. Because one symbol occupies a plurality of tones on a frequency axis in the FQAM scheme to differ from the QAM scheme, it is unsuitable to apply a method of calculating an LLR in the QAM scheme to the FQAM scheme. That is, if the method of calculating the LLR in the QAM scheme is applied to decode a symbol generated by the FQAM scheme, there may be great performance deterioration. Therefore, it is needed to provide an effective method of calculating an LLR in the FQAM scheme.

SUMMARY

To address the above-discussed deficiencies, it is a primary object to provide an apparatus and method for generating a decoding metric in a wireless communication system.

Another aspect of the present disclosure is to provide an apparatus and method for generating a Gaussian decoding metric in which complexity for FQAM is low in a wireless communication system.

Another aspect of the present disclosure is to provide an apparatus and method for generating a non-Gaussian decoding metric which is approached to channel capacity for FQAM in a wireless communication system.

In accordance with an aspect of the present disclosure, an operation method of a receiving end in a wireless communication system is provided. The operation method includes receiving an FQAM symbol and determining transmission probabilities of FQAM symbol candidates from a received value of the FQAM symbol, wherein the determination of the transmission probabilities of the FQAM symbol candidates comprises multiplying a probability that a QAM symbol included in the FQAM symbol is mapped to each of candidate values in one frequency and a probability that a signal is not transmitted in the other at least one frequency.

In accordance with another aspect of the present disclosure, a receiving end apparatus in a wireless communication system is provided. The receiving end apparatus includes an RF processing unit for receiving an FQAM symbol and a modem for determining transmission probabilities of FQAM symbol candidates from a received value of the FQAM symbol, wherein the modem multiplies a probability that a QAM symbol included in the FQAM symbol will be mapped to each of candidate values in one frequency and a probability that a signal is not transmitted in the other at least one frequency.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Exemplary embodiments of the present disclosure will be described herein below with reference to the accompanying drawings. In the following description, well-known functions or constructions are not described in detail since they would obscure the disclosure in unnecessary detail.

Hereinafter, a description will be given for an apparatus and method for generating a decoding metric for FQAM in a wireless communication system.

Figures 1A, 1B, 1C:
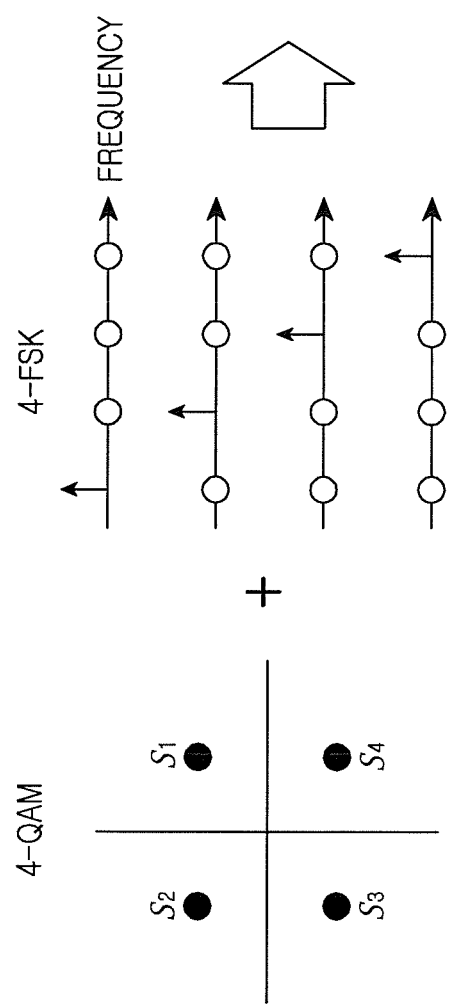
FIGS. 1A to 1C illustrate a concept of an FQAM scheme according to one embodiment of the present disclosure.

FIGS. 1A to 1C illustrate a concept of an FQAM scheme according to one embodiment of the present disclosure. FIG. 1 illustrates a 16-FQAM scheme in which a 4-QAM scheme and a 3-FSK modulation scheme are combined.

Figure 4:
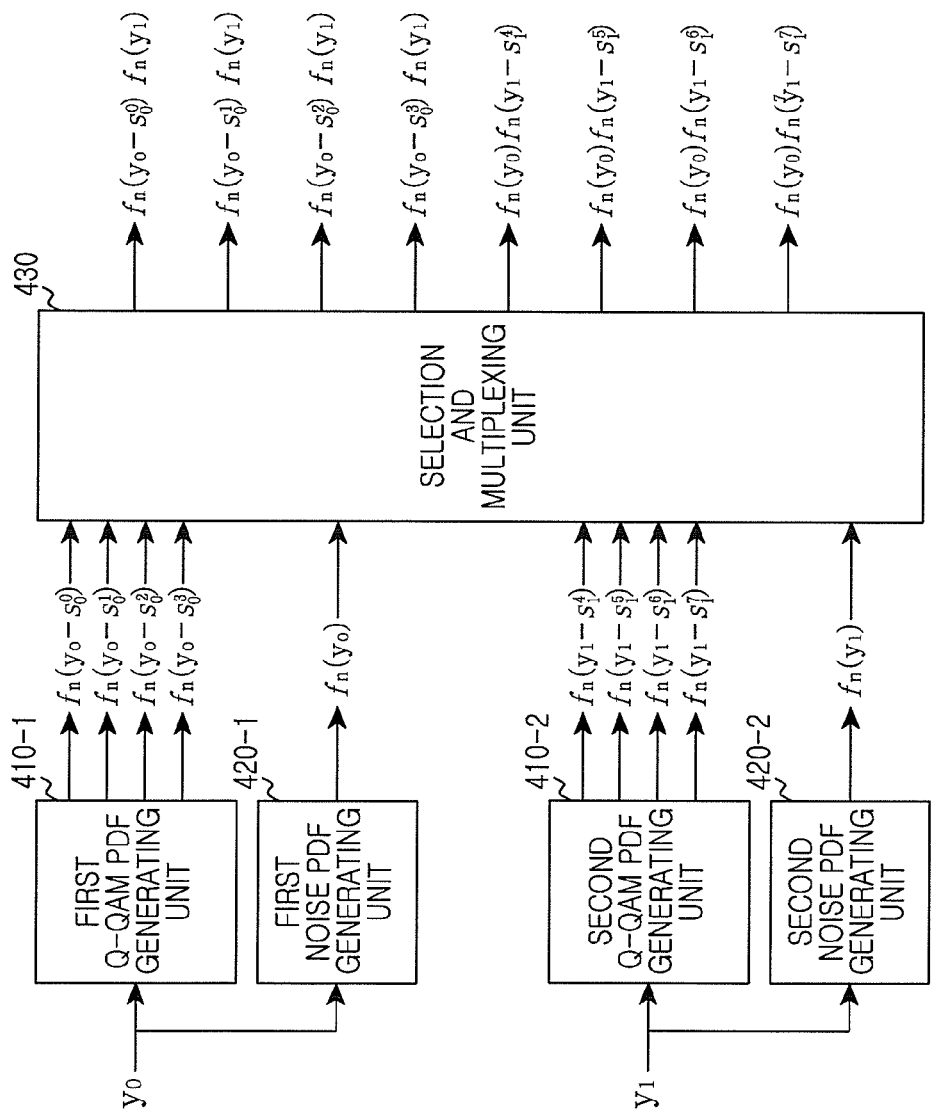
FIG. 4 is a block diagram illustrating configuration of an FQAM pdf generating means in a wireless communication system according to one embodiment of the present disclosure.

Referring to FIGS. 1A to 1C, in the 4-QAM scheme shown in FIG. 1A, 4 complex symbols having different phases may be generated by having 4 constellation points in an orthogonal coordinate system. In the 4-FSK modulation scheme shown in FIG. 1B, 4 complex symbols having different frequency values may be generated by using 4 frequency values. In the 16-FQAM scheme, the 4-QAM scheme and the 4-FSK modulation scheme are combined. As shown in FIG. 1C, because FQAM symbols have 4 different frequency values and simultaneously have 4 phase values, a total of 16 symbols can be generated.

As described above, the number of bitstreams which can be expressed by only the QAM scheme is expanded by the number of frequencies using whether QAM symbols are mapped to any frequency. That is, the number of bitstreams which can be expressed by only the FSK modulation scheme are expanded by the number of QAM symbols using a phase and size of each of FSK symbols. That is, each of FQAM symbols is identified by combination of a phase and size of each of the FQAM symbols and a position on a frequency to which each of the FQAM symbols is mapped.

Figure 2:
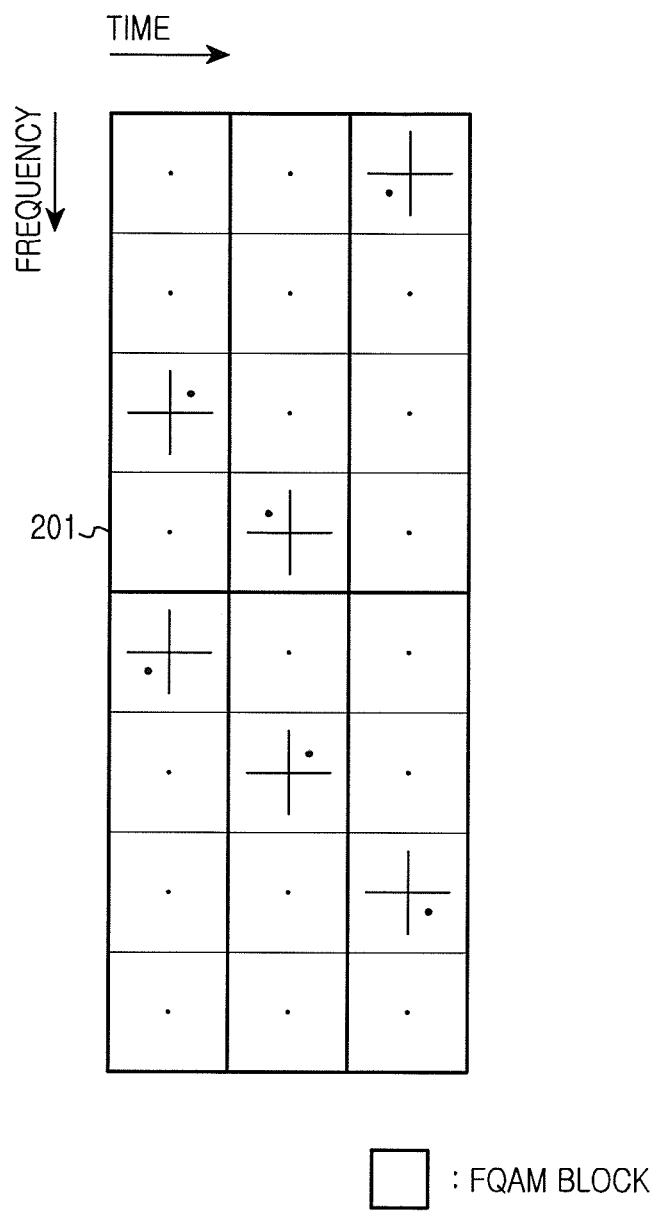
FIG. 2 is an example of configuring signals when applying FQAM in a wireless communication system according to one embodiment of the present disclosure.

FIG. 2 is an example of configuring signals when applying FQAM in a wireless communication system according to one embodiment of the present disclosure. FIG. 2 illustrates some of frames when the FQAM scheme is applied to a wireless communication system of an Orthogonal Frequency Division Multiplexing/Orthogonal Frequency Division Multiplexing Advanced (OFDM/OFDMA) scheme. FIG. 2 is an example of applying the 16-FQAM scheme shown in FIG. 1C.

As shown in FIG. 2, a horizontal axis represents a time and a vertical axis represents a frequency. A classification unit on a time axis is a symbol and a classification unit on a frequency axis is a subcarrier. A unit including one symbol and one subcarrier is referred to as a tone.

Referring to FIG. 2, one FQAM block includes 4 tones which occupy one symbol and 4 subcarriers. As shown in FIG. 2, subcarriers included in one FQAM block are shown to be, but is not limited to, adjacent. Also, subcarriers included in one FQAM block may not continue physically. Seeing a first block 201, any symbol is not mapped to a first tone, a second tone, and a fourth tone among 4 symbols and a symbol is mapped to a third tone. The symbol mapped to the third tone has a "1+j" phase value. That is, the FQAM symbol represents information of 4 bits through a position on the frequency axis of the tone to which the symbol is mapped and a phase value of the symbol itself.

A FQAM degree can be expressed by combination of a QAM degree and an FSK degree. When the FQAM degree is provided, a ratio between the QAM degree and the FSK degree can be determined according to channel quality. For example, when a channel is relatively bad, it is preferable that the FSK degree is increased. On the other hand, when a channel is relatively good, it is preferable than the QAM degree is increased.

Therefore, a transmitting end and a receiving end which support the FQAM scheme can determine the QAM degree and the FSK degree according to the channel quality. For example, when the transmitting end or the receiving end is a base station, the base station can determine the QAM degree and the FSK degree and notify the determined degrees or combination of the degrees to a mobile station. In this case, the degrees or the combination of the degrees can be notified through a map message. For this, at least one of the transmitting end and the receiving end can store a table defining combination of a QAM degree and an FSK degree corresponding to channel quality.

A most channel decoder receives an LLR and estimates an information bit or a symbol. In general, a binary decoder calculates an LLR using following Equation 1 shown:

$$L_{k,\lambda}^{BICM}(\hat{H}[k], y[k]) = \ln \frac{\sum_{\omega \in A_0^{\lambda}} f_{Y[k]}(y[k] \mid \hat{H}[k], s[k] = \omega)}{\sum_{\omega \in A_1^{\lambda}} f_{Y[k]}(y[k] \mid \hat{H}[k], s[k] = \omega)} \quad \text{[Equation 1]}$$

In Equation 1, $L_{k,\lambda}^{BICM}$ represents an LLR of a Xth bit of a kth symbol corresponding to binary decoding. $\hat{H}[k]$ represents estimation of a channel coefficient for a k-th transmission symbol. $y[k]$ represents a received signal corresponding to the k-th transmission symbol. $A_0^{\lambda}$ is a set of candidate symbols whose λ-th bit is 0. $A_1^{\lambda}$ is a set of candidate symbols whose λth bit is 1. $f_{Y[k]}$ means a probability density function (pdf) for a k-th reception symbol. $s[k]$ means the k-th transmission symbol. $\omega$ is a dummy variable indicating a transmissible symbol candidate. In case of 16-QAM, $A_0^{\lambda}$ includes 8 of all 16 symbols and $A_1^{\lambda}$ includes the other 8 of all the 16 symbols.

On the other hand, a non-binary decoder calculates an LLR using Equation 2 shown below and uses the calculated result as input.

$$L_k^{CM}(y[k], \hat{H}[k]) = (L_0, L_1, \ldots, L_{M-1})$$

where $L_l = \ln(f_{Y[k]}(y[k] \mid \hat{H}[k], s[k] = x_l))$     [Equation 2]

In Equation 2, $L_k^{CM}$ means a symbol LLR for a k-th symbol. y[k] means a received signal corresponding to a k-th transmission symbol. Ĥ[k] means estimation of a channel coefficient for the k-th transmission symbol. $L_1$ means an LLR corresponding to an l-th candidate symbol. $f_{Y[k]}()$ means a pdf of a k-th reception symbol. s[k] means the k-th transmission symbol. $x_l$ means an l-th candidate symbol.

As it is known from Equations 1 and 2, it is needed to calculate a pdf to calculate an LLR necessary for channel decoding.

There is a Complex generalized Gaussian (CGG) distribution decoding method which is a representative method among conventional non-Gaussian decoding methods. It is assumed that an interference signal or a noise follows a CGG distribution in the CGG decoding method. In the CGG decoding method, an LLR or a pdf is calculated and the calculated result is provided as input of a channel decoder. Because the CGG decoding method includes a Gaussian decoding method, a description will be given for only the CGG decoding method according to one embodiment of the present disclosure. A pdf of a CGG distribution is calculated using Equation 3 shown below.

$$f_Z(z \mid \alpha, \beta) = \frac{\alpha}{2\pi\beta^2 \Gamma\left(\frac{2}{\alpha}\right)} \exp\left(-\left(\frac{|z|}{\beta}\right)^\alpha\right) \quad \text{[Equation 3]}$$

In Equation 3, $f_Z$ is a pdf of a noise. z is a variable indicating the noise. α as a shape parameter is a variable expressing a degree of non-Gaussian. β as a scale parameter is a variable expressing dispersion. Γ as a gamma function is defined as $$\Gamma(z) \stackrel{\Delta}{\approx} \int_0^\infty t^{z-1} \exp(-1) \, dt.$$

In Equation 3, if α is 2, the pdf of CGG distribution follows a Gaussian distribution. When α is less than 2, the pdf of the CGG distribution follows a super-Gaussian distribution having a heavy tail. When α is greater than 2, the pdf of the CGG distribution follows a sub-Gaussian distribution having a light tail. That is, if α is 2, the CGG decoding method is equal to a Gaussian decoding method.

Most interference signals and noises are modeled as super-Gaussian or Gaussian in which an α value belongs to 0 to 2. β which is called the scale parameter performs a roll like dispersion of a Gaussian pdf. Pdfs used in most non-Gaussian decoding method include a shape parameter and a scale parameter like α and β. Accordingly, the description was given for the CGG as an example according to one embodiment of the present disclosure. However, it is obvious that the present disclosure can be equally applied to most of existing non-Gaussian decoding methods.

In order to perform CGG decoding of QAM, it is needed to calculate a pdf formula shown in Equation 4 shown below.

$$f_{Y[k]}(y[k] \mid \hat{H}[k], s[k]) = \quad \text{[Equation 4]}$$
$$\frac{\alpha}{2\pi\beta^2 \Gamma(2/\alpha)} \exp\left[-\left[\frac{y[k] - \hat{H}[k]s[k]}{\beta}\right]^\alpha\right]$$

In Equation 4, $f_{Y[k]}$ represents a pdf of a transmission symbol. y[k] represents a received signal corresponding to a kth transmission symbol. Ĥ[k] represents a channel coefficient for the kth transmission symbol. s[k] represents the kth transmission symbol. α represents a shape parameter. β represents a scale parameter. Γ as a gamma function is defined as $$\Gamma(z) \stackrel{\Delta}{\approx} \int_0^\infty t^{z-1} \exp(-1) \, dt.$$

There are various methods of estimating an α value and a β value.

Hereinafter, a description will be given for a moment matching scheme, which is a previously suggested method, as an example. In accordance with the moment matching scheme, the α value and the β value are estimated by matching a first moment with a second moment. The α value and the β value are estimated using Equation 5 shown below.

$$\alpha = \frac{\ln(3^6/2^{10})}{\ln\left(\left(E[|\hat{j}[k]|]\right)^2 / E[|\hat{j}[k]|^2]\right) - \left(\frac{\pi}{4} + \frac{9}{2^{3.5}}\right) + \ln\left(\frac{3}{2\sqrt{2}}\right)} \quad \text{[Equation 5]}$$

$$\hat{j}[k] = y[k] - \hat{H}[k]\hat{s}[k]$$

$$\beta = \frac{\Gamma(2/\alpha)}{\Gamma(3/\alpha)} E[|\hat{j}[k]|]$$

In Equation 5, α is a shape parameter. α is a scale parameter. y[k] is a received signal corresponding to a kth transmission symbol. Ĥ[k] is estimation of a channel coefficient for the kth transmission symbol. ŝ is the k-th transmission symbol estimated by a hard decision type. Γ as a gamma function is defined as $$\Gamma(z) \stackrel{\Delta}{\approx} \int_0^\infty t^{z-1} \exp(-1) \, dt.$$

In case of the FQAM scheme, because one symbol occupies a plurality of tones to differ from the QAM scheme, it is unsuitable to apply an LLR calculating method suggested for the QAM scheme to the FQAM scheme. Accordingly, one embodiment of the present disclosure can calculate a pdf for a Gaussian or non-Gaussian symbol for FQAM using Equations 6 and 7.

$$f_{Y[k]}(y[k] \mid \hat{H}[k], m[k], s[k]) = \prod_{l=0}^{M_F-1} f_{Y_l[k]}(y_l[k] \mid \hat{H}_l[k], m[k], s[k]) \quad \text{[Equation 6]}$$

In Equation 6, $f_{Y[k]}()$ means a pdf of a transmission symbol. y[k] means a received signal corresponding to a k-th transmission symbol. Ĥ[k] means estimation of a channel coefficient for the k-th transmission symbol. m[k] means an index of a frequency tone with a QAM symbol in a k-th FQAM block. s[k] means a QAM symbol of the kth transmission symbol. $M_F$ means the number of tones included in an FQAM block. $f_{Y_l[k]}()$ means a pdf of a transmission symbol in an lth tone. $y_l[k]$ means a received signal corresponding to a k-th transmission symbol in the lth tone. $\hat{H}_l[k]$ means estimation of a channel coefficient for the k-th transmission symbol in the l-th tone.

$$f_{Y_l[k]}(y_l[k] \mid \hat{H}_l[k], m[k], s[k]) = \qquad \text{[Equation 7]}$$
$$\frac{\alpha}{2\pi\beta^2 \Gamma(2/\alpha)} \exp\left(-\left(\frac{|y[k] - \hat{H}_l[k]s[k]\delta_{l,m[k]}|}{\beta}\right)^\alpha\right)$$

In Equation 7, $f_{Y_l[k]}()$ means a pdf of a transmission symbol in an lth tone. $y_l[k]$ means a received signal corresponding to a kth transmission symbol in the lth tone. $\hat{H}_l[k]$ means estimation of a channel coefficient for the kth transmission symbol in the lth tone. m[k] means an index of a frequency tone with a QAM symbol in a kth FQAM block. s[k] means a QAM symbol of a kth transmission symbol. $\alpha$ means a shape parameter. $\beta$ means a scale parameter. $\Gamma$ means a gamma function. $\delta_{l,m[k]}$ means a delta function. The gamma function is defined as $$\Gamma(z) \triangleq \int_0^\infty t^{z-1} \exp(-1) \, dt.$$

If l and m[k] are identical to each other, the delta function provides 1 or 0 as a result.

The difference between a FQAM pdf and a QAM pdf is as in the below. In case of the FQAM scheme, because one symbol occupies a plurality of tones, a symbol pdf must be expressed as a pdf of each of the tones. It is required to perform i.i.d. among QAM symbols or interference signals between the tones according to one embodiment of the present disclosure. Accordingly, a symbol pdf is expressed as multiplication of pdfs of the tones. In order to perform the method according to one embodiment of the present disclosure, it is needed to provide a means for generating a symbol pdf by multiplying a pdf per tone. In accordance with the method according to one embodiment of the present disclosure, decoding performance which is approached to theoretical limit performance can be obtained.

Most of conventional non-Gaussian decoding methods include a multiplier calculation of a shape parameter $\beta$. Because an $\alpha$ value is an integer value which is greater than 0, generally, complexity for calculating a multiplier of the shape parameter $\alpha$ is very high. Accordingly, one embodiment of the present disclosure further provides a method of reducing complexity of a multiplier calculation of the non-Gaussian decoding method.

In accordance with one embodiment of the present disclosure, a receiving end can set the shape parameter $\alpha$ to a fixed value. Because most of real interference signals or noises follow a super-Gaussian distribution having a heavy tail, a shape parameter $\alpha$ of non-Gaussian distribution (e.g., CGG, GG, and SaS) has values of 0 to 2 generally. Accordingly, one embodiment of the present disclosure provides a method of fixing the shape parameter to 1 using Equation 8. Although the shape parameter is fixed to 1, performance which is approached to theoretical limit performance can be provided in a real cellular environment.

$$f_{Y_l[k]}(y_l[k] \mid \hat{H}_l[k], m[k], s[k]) = \qquad \text{[Equation 8]}$$
$$\frac{1}{2\pi\beta^2} \exp\left(-\frac{|y[k] - \hat{H}_l[k]s[k]\delta_{l,m[k]}|}{\beta}\right)$$

In Equation 8, $f_{Y_l[k]}()$ means a pdf of a transmission symbol in an l-th tone. $y_l[k]$ means a received signal corresponding to a k-th transmission symbol in the l-th tone. $\hat{H}_l[k]$ means estimation of a channel coefficient for the kth transmission symbol in the lth tone. m[k] means an index of a frequency tone with a QAM symbol in a kth FQAM block. s[k] means a QAM symbol of a kth transmission symbol. $\beta$ means a scale parameter. $\Gamma$ means a gamma function. $\delta_{l,m[k]}$ means a delta function. The gamma function is defined as $$\Gamma(z) \triangleq \int_0^\infty t^{z-1} \exp(-1) \, dt.$$

If l and m[k] are identical to each other, the delta function provides 1 or 0 as a result.

In accordance with another embodiment of the present disclosure, the receiving end can select one of a plurality of candidates without fixing the shape parameter $\alpha$ to one value. The method of fixing the shape parameter to 1 using Equation 8 generates a small quantity of performance deterioration in a channel whose non-Gaussian characteristic is not strong. In order to avoid the performance deterioration, another embodiment of the present disclosure can estimate the shape parameter, compare the estimated value with a plurality of predetermined $\alpha$ value candidates, and replace and use the estimated value with the most approached candidate.

In accordance with another embodiment of the present disclosure, the receiving end can use a polynomial having a less amount of calculation for the whole or partial interval of a pdf. For example, Taylor approximation can be used instead of an exponential function shown in Equations 7 and 8. In more detail, if Taylor expansion of Exp(x) is performed, Exp(x) is expressed as an infinite series such as "$1+x+(x^2)/2+(x^3)/6+\ldots$". Herein, polynomial fitting can be performed by obtaining only a certain number of terms which have a great influence on an infinite number of series. For example, when obtaining only 3 terms, Exp(x) is approximated to $1+x+(x^2)/2$. That is, the polynomial for reducing an amount of calculation can include the previously defined number of terms in a Taylor series of an exponential function.

Hereinafter, a description will be given for a process of generating an FQAM pdf together with a concrete example. For convenience of description, a description will be given for an 8-FQAM scheme in which a 4-QAM scheme and a 2-FSK modulation scheme are combined as an example. Hereinafter, "to calculate a probability value" and "to calculate a pdf" are used as the same meaning. The pdf is a formula of probability. This is because a probability value is soon determined when an input variable is replaced after the pdf is determined.

FIGS. 3A to 3H are examples of 8-FQAM constellation points in a wireless communication system according to one embodiment of the present disclosure.

Figure 3A:
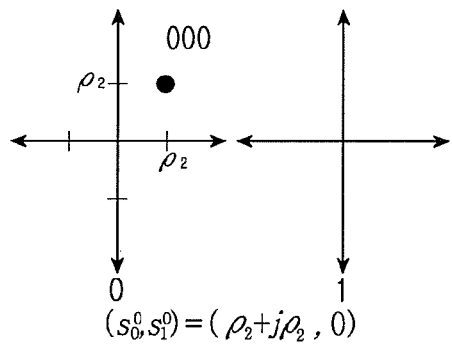
FIGS. 3A to 3H are examples of 8-FQAM constellation points in a wireless communication system according to one embodiment of the present disclosure.
Figure 3B:
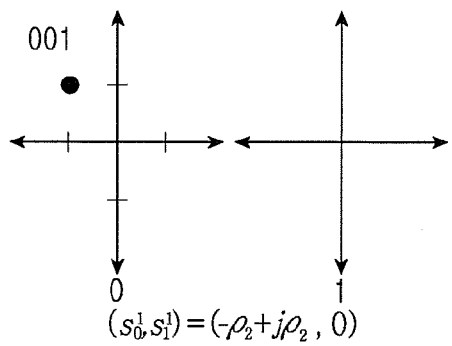
Figure 3C:
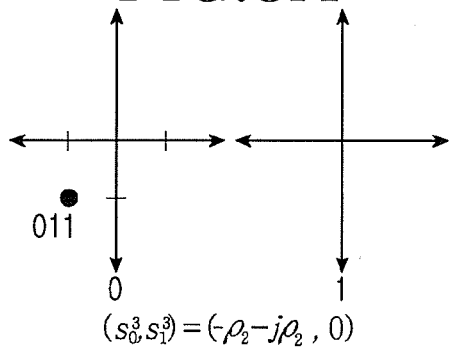
Figure 3D:
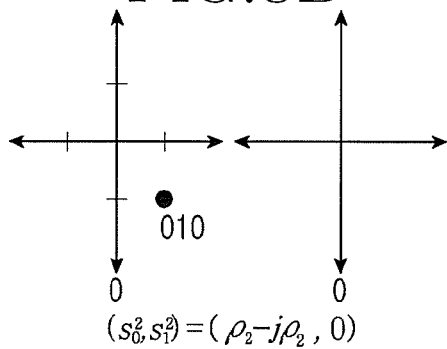
Figure 3E:
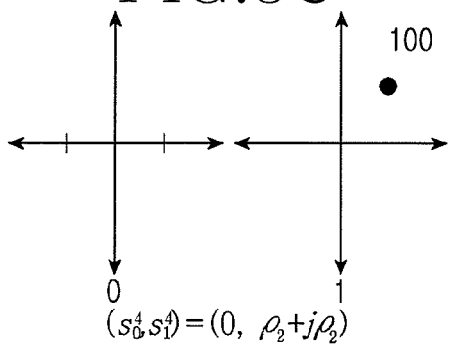
Figure 3F:
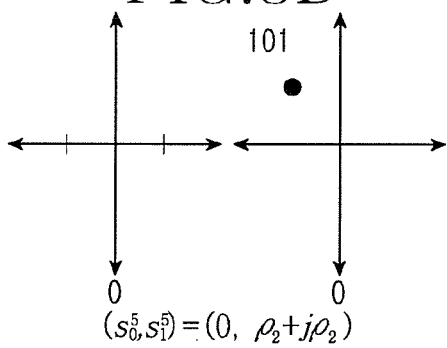
Figure 3G:
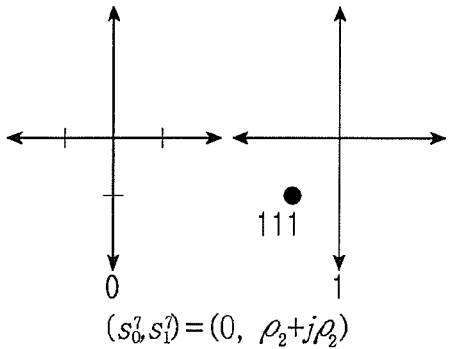
Figure 3H:
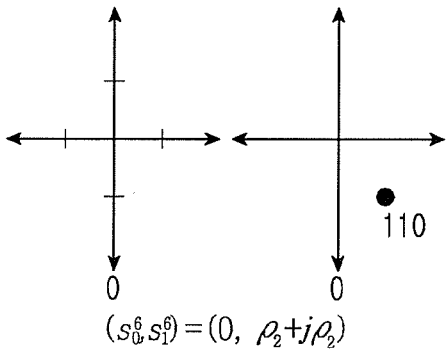

Referring to FIGS. 3A to 3H, in case of 8-FQAM, the total of 8 constellation points can be generated. As shown in FIGS. 3A to 3H, 2 orthogonal coordinate systems indicate 2 tones mapped to different subcarriers. A QAM symbol has a $\rho_2$ value in a real axis and a $\rho_2$ value in an imaginary axis. Herein, the $\rho_2$ value is set to a square root $$\left(\sqrt{\frac{E_s}{2}}\right)$$

value of a half of the energy of the QAM symbol. As shown in FIG. 3A, an FQAM symbol is mapped to a first carrier and has a $\rho_2 + j\rho_2$ value. As shown in FIGS. 3A to 3H, each of the constellation points is expressed as a formula shown in Equation 9 shown below.

$$(s_0^0, s_1^0) = (\rho_2 + j\rho_2, 0)$$

$$(s_0^1, s_1^1) = (-\rho_2 + j\rho_2, 0)$$

$$(s_0^2, s_1^2) = (\rho_2 - j\rho_2, 0)$$

$$(s_0^3, s_1^3) = (-\rho_2 - j\rho_2, 0)$$

$$(s_0^4, s_1^4) = (0, \rho_2 + j\rho_2)$$

$$(s_0^5, s_1^5) = (0, \rho_2 + j\rho_2)$$

$$(s_0^6, s_1^6) = (0, \rho_2 + j\rho_2)$$

$$(s_0^7, s_1^7) = (0, \rho_2 + j\rho_2)$$

In Equation 9, $s_a^b$ means a symbol value mapped to a subcarrier a when information indicated by an FQAM symbol is b. $\rho_2$ means an absolute value of a real axis and an imaginary axis of a QAM symbol.

If the rest except for a transmission signal in a reception signal is an additional noise, pdfs which must be calculated to generate a decoding metric are calculated using Equation 10 shown below.

$$f_n^0([y_0, y_1] - [s_0^0, s_1^0]) = f_n(y_0 - s_0^0) f_n(y_1 - s_1^0) = f_n(y_0 - s_0^0) f_n(y_1)$$

$$f_n^1([y_0, y_1] - [s_0^1, s_1^1]) = f_n(y_0 - s_0^1) f_n(y_1 - s_1^1) = f_n(y_0 - s_0^1) f_n(y_1)$$

$$f_n^2([y_0, y_1] - [s_0^2, s_1^2]) = f_n(y_0 - s_0^2) f_n(y_1)$$

$$f_n^3([y_0, y_1] - [s_0^3, s_1^3]) = f_n(y_0 - s_0^3) f_n(y_1)$$

$$f_n^4([y_0, y_1] - [s_0^4, s_1^4]) = f_n(y_0) f_n(y_1 - s_1^4)$$

$$f_n^5([y_0, y_1] - [s_0^5, s_1^5]) = f_n(y_0) f_n(y_1 - s_1^5)$$

$$f_n^6([y_0, y_1] - [s_0^6, s_1^6]) = f_n(y_0) f_n(y_1 - s_1^6)$$

$$f_n^7([y_0, y_1] - [s_0^7, s_1^7]) = f_n(y_0) f_n(y_1 - s_1^7)$$

In Equation 10, $f_n^b(\ )$ means a probability function that information indicated by a transmitted FQAM symbol will be b. $f(\ )$ means a pdf for a noise. $y_a$ means a signal received through a subcarrier a. $s_a^b$ means a symbol value mapped to the subcarrier a when the information indicated by the transmitted FQAM symbol is b.

As shown in Equation 10, each of probability values for each of transmissible symbols is determined by multiplying probabilities in each of subcarriers. For example, as shown in FIG. 3A, a probability value for an FQAM symbol "000" is determined by multiplying a probability that "$\rho_2 + j\rho_2$" will be transmitted in a first subcarrier and a probability that "0" will be transmitted in a second subcarrier. Herein, the probability that the "$\rho_2 + j\rho_2$" will be transmitted in the first subcarrier is a probability that the same noise as a value in which the "$\rho_2 + j\rho_2$" is subtracted from a received signal in the first subcarrier will be generated. The "$\rho_2 + j\rho_2$" will be transmitted in the first subcarrier can be determined by a pdf of the noise. The probability that the "0" will be transmitted in the second subcarrier is a probability that the same noise as a received signal value in the second subcarrier will be generated. The probability that the "0" will be transmitted in the second subcarrier can be determined by a pdf of the noise. For example, the pdf of the noise can be calculated using Equations 7 and 8.

FIG. 4 is a block diagram illustrating configuration of an FQAM pdf generating means in a wireless communication system according to one embodiment of the present disclosure. FIG. 4 conceptually illustrates a process of generating a probability of each of transmissible FQAM symbols from a receiving value of an FQAM symbol.

Referring to FIG. 4, a received signal value $y_0$ in a first subcarrier is input to a first Q-QAM pdf generating unit 410-1 and a first noise pdf generating unit 420-1. A received signal value $y_1$ in a second subcarrier is input to a second Q-QAM pdf generating unit 410-2 and a second noise pdf generating unit 420-2. Accordingly, the first Q-QAM pdf generating unit 410-1 outputs probability values for 4 cases in which an FQAM symbol is located on the first subcarrier. The second Q-QAM pdf generating unit 410-2 outputs probability values for 4 cases in which an FQAM symbol is located on the second subcarrier. Each of the first noise pdf generating unit 420-1 and the second noise pdf generating unit 420-2 outputs a probability value that each of the provided received signal values $y_0$ and $y_1$ will be a noise. Thereafter, a selection and multiplexing unit 430 multiplies the probability value generated by the second noise pdf generating unit 420-2 by each of the probability values generated by the first Q-QAM pdf generating unit 410-1. The selection and multiplexing unit 430 multiplies the probability value generated by the first noise pdf generating unit 420-1 by each of the probability values generated by the second Q-QAM pdf generating unit 410-2. Therefore, probability values for transmissible symbols, shown in Equation 10, are determined.

As shown in FIG. 4, if the received signal value $y_0$ in the first subcarrier is input, the first noise pdf generating unit 420-1 outputs a probability that a received signal will be a noise irrespective of whether a transmitted FQAM symbol is any symbol. Also, if the received signal value $y_1$ in the second subcarrier is input, the second noise pdf generating unit 420-2 outputs a probability that a received signal will be a noise irrespective of whether a transmitted FQAM symbol is any symbol. Accordingly, in the selection and multiplexing unit 430, each of probabilities of values where a QAM symbol can be located in each subcarrier is multiplied by one noise probability. That is, the noise probability can be determined only once without being repeatedly calculated for each of a plurality of probability values.

As described above, a decoding metric is generated from the determined probability values for transmissible symbols. In case of an LLR, the decoding metric can be determined as a ratio of other probability values based on one probability value.

One embodiment of the present disclosure shown in FIGS. 3 and 4 illustrates that a QAM degree is 4 and an FSK degree is 2. Accordingly, in one embodiment of the present disclosure shown in FIGS. 3 and 4, 8 probability values are calculated. Each of the 8 probability values is expressed as multiplication of 2 probability values and 2 frequencies. Herein, the 2 probability values include a probability that a symbol will not be transmitted in one frequency and a probability that a specific symbol will be transmitted in the other frequency(ies). If the QAM degree and the FSK degree differ from each other, the number of used probability values can also differ.

Hereinafter, a description will be given for an operation and configuration of a receiving end for generating a decoding metric with reference to drawings in more detail.

Figure 5:
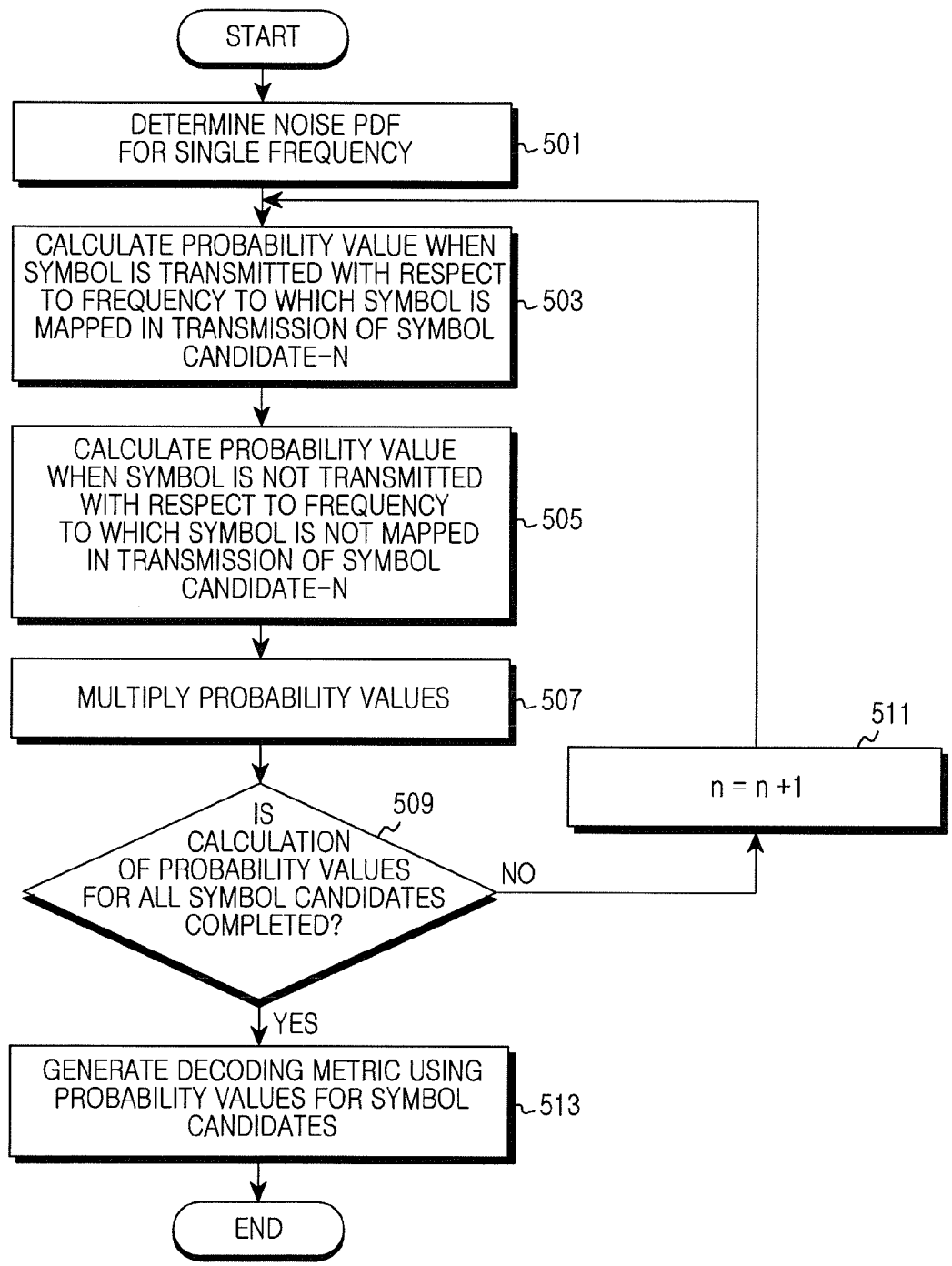
FIG. 5 is a flowchart illustrating an operation process of a receiving end in a wireless communication system according to one embodiment of the present disclosure.

FIG. 5 is a flowchart illustrating an operation process of a receiving end in a wireless communication system according to one embodiment of the present disclosure. When the process shown in FIG. 5 is started, n is initialized to 0.

Referring to FIG. 5, the receiving end determines a pdf of a noise to be applied in a single frequency in step 501. For example, the pdf of the noise is shown in Equation 3. In order to determine the pdf of the noise, the receiving end must determine a shape parameter α and a scale parameter β. In accordance with one embodiment of the present disclosure, the shape parameter α and the scale parameter β can be calculated in consideration of a channel environment or be defined as a fixed value to reduce an amount of calculation. For example, the shape parameter α and the scale parameter β can be calculated using Equation 5. In addition, in order to more reduce an amount of calculation, the receiving end can replace the pdf of the noise with a polynomial with respect to the whole or partial interval.

Thereafter, the receiving end proceeds to step 503 and calculates a probability value when a QAM symbol is transmitted with respect to a frequency to which the QAM symbol is mapped in transmission of a symbol candidate-n. The symbol candidate means one of transmissible FQAM symbols. For example, in case of 8-QAM, as shown in FIGS. 3A to 3H, 8 symbols are symbol candidates. Herein, the n as an index of a symbol candidate can be a bit value indicated by a corresponding FQAM symbol. For example, referring to FIGS. 3A to 3H, a symbol candidate-0 is shown in FIG. 3A. In this case, because a QAM symbol is $\rho_2+j\rho_2$ and is mapped to a first frequency, the receiving end calculates a probability that $\rho_2+j\rho_2$ will be transmitted in the first frequency. That is, the receiving end determines a probability that the same noise as a value in which $\rho_2+j\rho_2$ is subtracted from a received signal in the first frequency will be generated using the pdf of the noise.

The receiving end proceeds to step 505 and calculates a probability value when a QAM symbol is not transmitted with respect to a frequency to which the QAM symbol is not mapped in transmission of the symbol candidate-n. The symbol candidate means one of transmissible FQAM symbols. For example, in case of 8-FQAM, as shown in FIGS. 3A to 3H, 8 symbols are symbol candidates. Herein, the n as an index of a symbol candidate can be a bit value indicated by a corresponding FQAM symbol. For example, referring to FIGS. 3A to 3H, a symbol candidate-0 is shown in FIG. 3A. In this case, because a QAM symbol is $\rho_2+j\rho_2$ and is mapped to a first frequency, the receiving end calculates a probability that $\rho_2+j\rho_2$ will be transmitted in a second frequency. That is, the receiving end determines a probability that the same noise as a received signal value in the first frequency will be generated using the pdf of the noise. When 3 or more frequencies are used in FQAM, the process of step 505 is repeatedly performed with respect to each of the other frequencies except for a frequency in a QAM symbol is transmitted.

Thereafter, the receiving end proceeds to step 507 and multiplies all of the probability values calculated in steps 503 and 505. That is, the receiving end determines a probability value that an FQAM symbol candidate-n will be transmitted by multiplying probability values calculated for frequencies. An FQAM symbol has a shape in which a corresponding QAM symbol is transmitted through one frequency and a symbol is not transmitted through at least one of the other frequencies. Accordingly, a transmission probability of a specific FQAM symbol can be expressed as multiplication of probability values which are independently calculated in frequencies.

Thereafter, the receiving end proceeds to step 509 and determines whether the calculation of probability values for all symbol candidates is completed. For example, in case of 8-FQAM shown in FIGS. 3A to 3H, the receiving end determines whether probability values for 8 FQAM symbol candidates are determined. If the calculation of the probability values is not completed, the receiving end proceeds to step 511, increases the n by 1, and returns to step 503. Accordingly, the processes of steps 503 and 505 are repeatedly performed by the number of FQAM symbol candidates.

If the calculation of the probability values is completed, the receiving end proceeds to step 513 and generates a decoding metric using the probability values for the symbol candidates. For example, when the decoding metric is an LLR, the receiving end selects a probability value of one FQAM symbol and determines a ratio between the selected probability value and probability values of other FQAM symbols.

Figure 6:
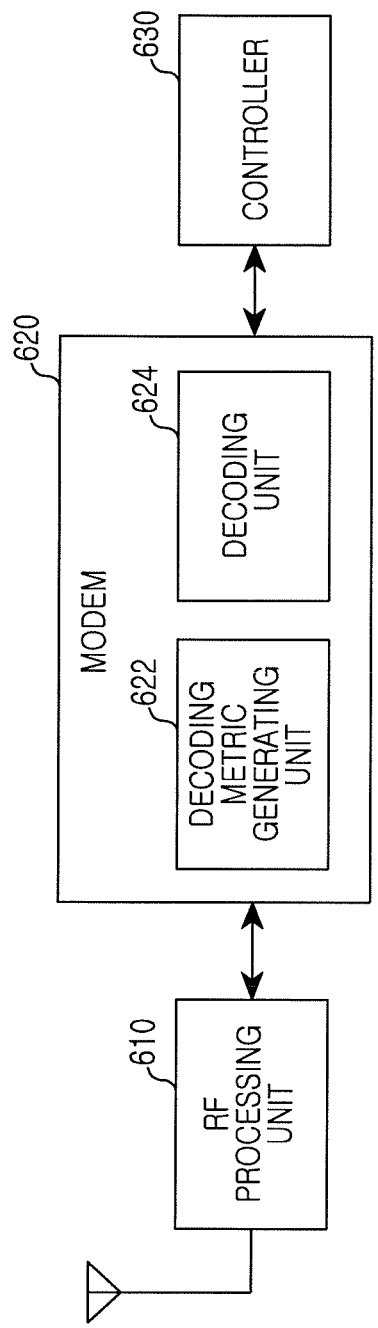
FIG. 6 is a block diagram illustrating configuration of a receiving end in a wireless communication system according to one embodiment of the present disclosure.

FIG. 6 is a block diagram illustrating configuration of a receiving end in a wireless communication system according to one embodiment of the present disclosure.

Referring to FIG. 6, the receiving end includes a Radio Frequency (RF) processing unit 610, a modem 620, and a controller 630.

The RF processing unit 610 performs a function for transmitting and received signals through a wireless channel, such as a signal band conversion function and a signal amplification function. That is, the RF processing unit 610 up-converts a baseband signal provided from the modem 620 into an RF band signal and transmits the RF band signal through an antenna. The RF processing unit 610 down-converts an RF band signal received through the antenna into a baseband signal. For example, the RF processing unit 610 can include an amplifier, a mixer, an oscillator, a Digital to Analog Converter (DAC), an Analog to Digital Converter (ADC), etc. As shown in FIG. 6, the receiving end has, but is not limited to, only one antenna. Also, the receiving end can have a plurality of antennas.

The modem 620 can perform a conversion function between a baseband signal and a bitstream according to physical layer standard of a system. For example, in case of following an OFDM scheme, when transmitting data, the modem 620 generates complex symbols by encoding and modulating transmission bitstreams, maps the complex symbols to subcarriers, and configures OFDM symbols through Inverse Fast Fourier Transform (IFFT) calculation and Cyclic Prefix (CP) insertion. Also, when receiving data, the modem 620 divides a baseband signal provided from the RF processing unit 610 on the basis of an OFDM symbol unit, restores signals mapped to subcarriers through FFT calculation, and restores a receiving bitstream through demodulation and decoding. As described above, the modem 620 and the RF processing unit 610 transmit and receive signals. Accordingly, the modem 620 and the RF processing unit 610 can be referred to as a transmission unit, a reception unit, a transmission and reception unit, or a communication unit.

Particularly, in accordance with one embodiment of the present disclosure, the modem 620 demodulates and decodes an FQAM symbol. For this, the modem 620 includes a decoding metric generating unit 622 and a decoding unit 620. The decoding metric generating unit 622 generates a decoding metric for decoding an FQAM symbol. The decoding unit 624 restores an information bitstream using the decoding metric. For example, the decoding metric generating unit 622 performs the processes shown in FIG. 5.

Hereinafter, a description will be given for an operation of the decoding metric generating unit 622 in more detail.

First of all, the decoding metric generating unit 622 determines a pdf of a noise to be applied in a single frequency. In order to determine the pdf of the noise, the decoding metric generating unit 622 must determine a shape parameter α and a scale parameter β. In accordance with one embodiment of the present disclosure, the shape parameter α and the scale parameter β can be calculated in consideration of a channel environment or be defined as a fixed value to reduce an amount of calculation. Herein, the decoding metric generating unit 622 can replace the pdf of the noise with a polynomial with respect to the whole or partial interval. The decoding metric generating unit 622 calculates a probability value when a QAM symbol is transmitted with respect to a frequency to which the QAM symbol is mapped in transmission of a symbol candidate-n and calculates a probability value when a QAM symbol is not transmitted with respect to at least one frequency to which the QAM symbol is not mapped. Thereafter, the decoding metric generating unit 622 determines a probability value that an FQAM symbol candidate-n will be transmitted by multiplying probability values calculated for frequencies. The decoding metric generating unit 622 repeatedly performs the above-described probability value calculation and multiplication with respect to each of FQAM symbol candidates and generates a decoding metric using probability values for symbol candidates. For example, when the decoding metric is an LLR, the decoding metric generating unit 622 selects a probability value of one FQAM symbol and determines a ratio between the selected probability value and probability values of other FQAM symbols.

The controller 630 controls overall operations of the receiving end. For example, the controller 630 transmits and receives signals through the modem 620 and the RF processing unit 610. Also, the controller 630 determines settings necessary for the demodulation and decoding of the modem 620. The controller 630 can include at least one processor.

Figure 7:
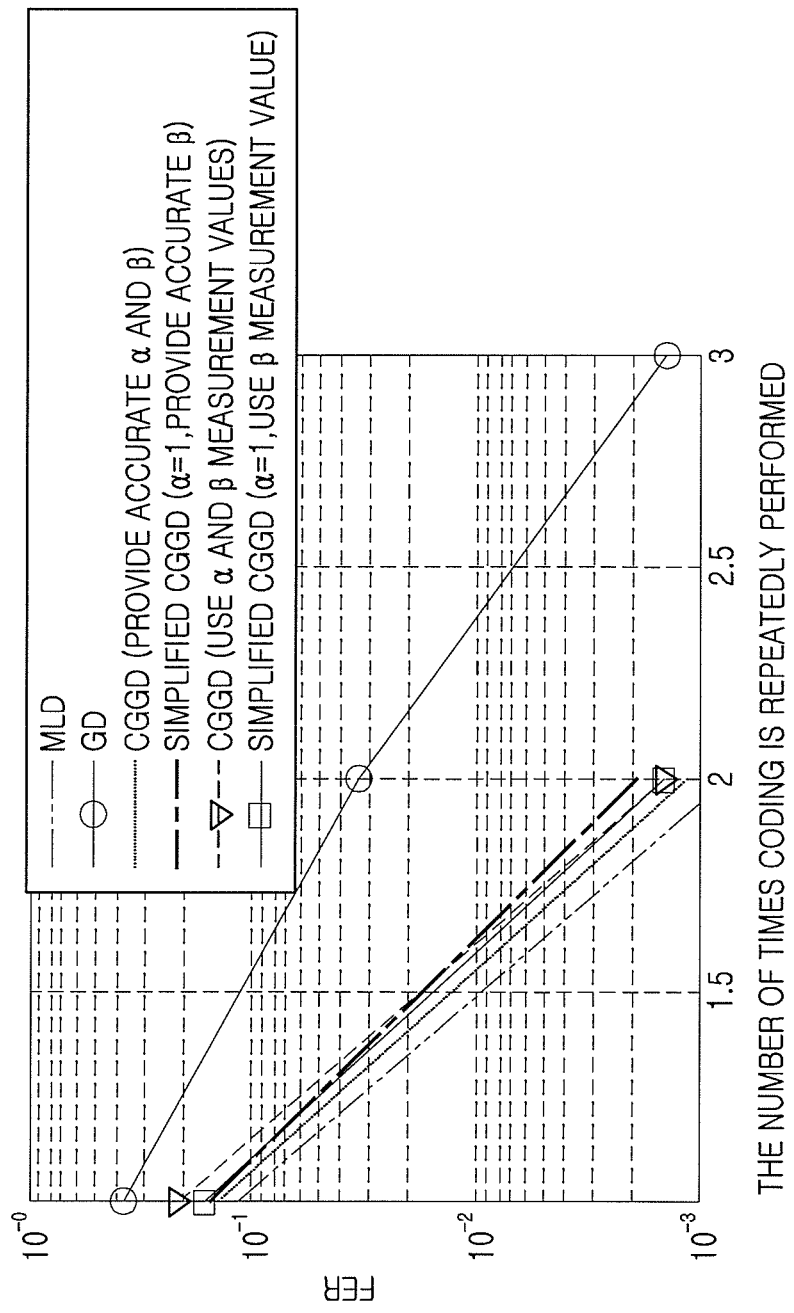
FIG. 7 is a waveform chart illustrating performance of a method of generating a decoding metric according to one embodiment of the present disclosure.

FIG. 7 is a waveform chart illustrating performance of a method of generating a decoding metric according to one embodiment of the present disclosure. FIG. 7 illustrates a performance graph when decoding metric generating methods according to a prior art and one embodiment of the present disclosure are applied.

For each modulation scheme, like a Long Term Evolution (LTE) system, it is assumed that repetition coding is performed after turbo coding of the same frame size (e.g., 240) is performed. As shown in FIG. 7, assuming a 16-FQAM scheme in which a 4-QAM scheme and a 4-FSK modulation scheme are combined, a horizontal axis represents the number of times coding is repeatedly performed and a vertical axis represents a Frame Error Rate (FET).

Referring to FIG. 7, MLD and GD as a conventional technology are suggested. In accordance with one embodiment of the present disclosure, various settings are applied, such as accurate shape and scale parameters α and β are provided, the shape parameters α is fixed to 1, and the shape and scale parameters α and β are directly calculated. As shown in FIG. 7, one embodiment of the present disclosure shows a FER which is considerably lower than that of the GD and shows performance which is similar to the MLD known as the optimum scheme.

As described above, the receiving end for supporting FQAM can improve its decoding performance by providing the decoding metric generating method to which characteristics of FQAM are reflected in the wireless communication system.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A method for supporting Frequency Quadrature Amplitude Modulation (FQAM), the method comprising:
   receiving an FQAM symbol; and
   determining transmission probabilities of FQAM symbol candidates from the received FQAM symbol,
   wherein the transmission probabilities of the FQAM symbol candidates are determined by multiplying a probability that a Quadrature Amplitude Modulation (QAM) symbol included in the FQAM symbol is mapped to each of candidate values in one frequency and a probability that a signal is not be transmitted in at least the other at least one frequency.

2. The method of claim 1, further comprising:
   determining a decoding metric based on the transmission probabilities of each of the FQAM symbol candidates.

3. The method of claim 2, wherein the decoding metric is a log-likelihood ratio (LLR).

4. The method of claim 1, wherein the probability that the signal is not transmitted includes a probability that a same noise as a received signal value in a corresponding frequency is generated.

5. The method of claim 1, wherein the probability that the signal is not transmitted includes a probability that a received signal in a corresponding frequency is a noise.

6. The method of claim 1, wherein the multiplying of the probability that the QAM symbol is mapped to one of the candidate values, and the probability that the signal is not transmitted in at least the other frequency comprises:
   determining each probability that the QAM symbol is mapped to each of the candidate values;
   determining one probability that the signal is not mapped; and
   multiplying the one probability that the signal is not mapped by each of the probabilities that the QAM symbol will be mapped.

7. The method of claim 1, further comprising determining a probability density function (pdf) of a noise.

8. The method of claim 7, wherein the pdf of the noise follows a Gaussian distribution.

9. The method of claim 7, wherein the pdf of the noise is calculated using $$f_{\hat{Z}}(z \mid \alpha, \beta) = \frac{\alpha}{2\pi\beta^2 \Gamma\left(\frac{2}{\alpha}\right)} \exp\left(-\left(\frac{|z|}{\beta}\right)^\alpha\right),$$

where $f_{\hat{Z}}$ is the pdf of the noise, z is a variable indicating the noise, $\alpha$ as a shape parameter is a variable expressing a degree of non-Gaussian, $\beta$ as a scale parameter expresses dispersion, and $\Gamma$ as a gamma function is defined as $$\Gamma(z) \triangleq \int_0^\infty t^{z-1} \exp(-1) \, dt.$$

10. The method of claim 9, wherein the shape parameter is set to a previously defined value.

11. The method of claim 9, wherein the shape parameter is set to one value that is the most approached to an estimated value among a plurality of previously defined candidate values.

12. The method of claim 7, wherein the pdf of the noise is a function in which a whole or partial interval is replaced with a polynomial.

13. The method of claim 12, wherein the polynomial includes the previously defined number of terms among Taylor series of a pdf formula of an exponential function type.

14. An apparatus in a wireless communication system for supporting Frequency Quadrature Amplitude Modulation (FQAM), the apparatus comprising:
a Radio Frequency (RF) processing unit configured to receive an FQAM symbol; and
a modem configured to determine transmission probabilities of FQAM symbol candidates from a received value of the FQAM symbol,
wherein the modem configured to multiply a probability that a Quadrature Amplitude Modulation (QAM) symbol included in the FQAM symbol is mapped to each of candidate values in one frequency, and a probability that a signal is not transmitted in the other at least one frequency.

15. The apparatus of claim 14, wherein the modem is configured to determine a decoding metric using the transmission probability of each of the FQAM symbol candidates.

16. The apparatus of claim 15, wherein the decoding metric is a log-likelihood ratio (LLR).

17. The apparatus of claim 14, wherein the probability that the signal is not transmitted includes a probability that a same noise as a received signal value in a corresponding frequency is generated.

18. The apparatus of claim 14, wherein the probability that the signal is not transmitted includes a probability that a received signal in a corresponding frequency is a noise.

19. The apparatus of claim 14, wherein the modem is configured to determine each of probabilities that the QAM symbol is mapped to each of the candidate values, determine one probability that the signal is not mapped, and multiply the one probability that the signal is not mapped by each of the probabilities that the QAM symbol is mapped.

20. The apparatus of claim 14, wherein the modem is configured to determine a pdf of a noise.

21. The apparatus of claim 20, wherein the pdf of the noise follows a Gaussian distribution.

22. The apparatus of claim 18, wherein the pdf of the noise is calculated using $$f_{\hat{Z}}(z \mid \alpha, \beta) = \frac{\alpha}{2\pi\beta^2 \Gamma\left(\frac{2}{\alpha}\right)} \exp\left(-\left(\frac{|z|}{\beta}\right)^\alpha\right),$$

where $f_{\hat{Z}}$ is the pdf of the noise, z is a variable indicating the noise, $\alpha$ as a shape parameter is a variable expressing a degree of non-Gaussian, $\beta$ as a scale parameter expresses dispersion, and $\Gamma$ as a gamma function is defined as $$\Gamma(z) \triangleq \int_0^\infty t^{z-1} \exp(-1) \, dt.$$

23. The apparatus of claim 22, wherein the shape parameter is set to a previously defined value.

24. The apparatus of claim 22 wherein the shape parameter is set to one value which is the most approached to an estimated value among a plurality of previously defined candidate values.

25. The apparatus of claim 20, wherein the pdf of the noise is a function in which a whole or partial interval is replaced with a polynomial.

26. The apparatus of claim 25, wherein the polynomial includes the previously defined number of terms among Taylor series of a pdf formula of an exponential function type.

* * * * *